United States Patent Office 3,119,870
Patented Jan. 28, 1964

---

3,119,870
PREPARATION OF TETRAALKYLAMMONIUM SUPEROXIDES
Joseph S. Hashman, Evans City, and Jerry W. Berkstresser, Carlisle, Pa., assignors to Callery Chemical Company, Pittsburgh, Pa., a corporation of Pennsylvania
No Drawing. Filed Mar. 21, 1961, Ser. No. 97,388
8 Claims. (Cl. 260—567.6)

This invention relates to a method for the preparation of tetramethylammonium superoxide.

The chemistry of the superoxides, i.e., compounds containing the superoxide, $O_2^-$, ion, has thus far been restricted to the study of compounds in which an alkali metal or an alkaline earth metal is combined with the superoxide ion. Recently, new superoxide compounds containing a complex organic cation have been prepared. These compounds, the tetraalkylammonium superoxides, and a method by which they may be obtained, are described in the coassigned application of Hashman and Renforth, Serial Number 832,864, and now abandoned. As is described therein, these new compounds are valuable intermediates in chemical synthesis as well as efficacious oxidizing agents.

It is an object of this invention to provide a new and improved method for the preparation of tetraalkylammonium superoxides.

Another object is to provide a method for the preparation of tetraalkylammonium superoxides in which a tetraalkylammonium compound is reacted directly with a superoxide.

Still other objects will become apparent hereinafter.

This invention is based upon the discovery that the reaction of a tetraalkylammonium halide or hydroxide with an alkali metal superoxide produces the corresponding tetraalkylammonium superoxide, $R_4NO_2$. The reaction takes place according to the equation:

$$R_4NX + MO_2 \rightarrow R_4NO_2 + MX$$

where X is a halogen or hydroxyl, M is an alkali metal and R is a lower alkyl group.

Among the tetraalkylammonium superoxides which can be produced in accordance with this invention are tetramethylammonium superoxide, $(CH_3)_4NO_2$, from tetramethylammonium hydroxide or a tetramethylammonium halide; tetraethylammonium superoxide, $(C_2H_5)_4NO_2$, from tetraethylammonium hydroxide or a tetraethylammonium halide; and tetrapropylammonium superoxide, $(C_3H_7)_4NO_2$, from tetrapropylammonium hydroxide or a tetrapropylammonium halide.

There are no particular reaction conditions necessary to produce the desired reaction, but the best results have been obtained at room temperature, except when liquid ammonia is used as a solvent; in that case lower temperatures are generally used.

In carrying out the reaction, it is not necessary to use a solvent, although one may be used if desired; the use of a solvent provides more rapid reaction. The solvents which may be used are chosen with regard to the particular reactants employed; any solvent in which one of the products of the reaction, i.e., the tetraalkylammonium superoxide or the alkali metal halide, is substantially insoluble may be used, with particularly good results. At present the preferred solvent is liquid ammonia, while another solvent which is useful in most instances is N,N'-dimethylformamide. Still other solvents which can be used with a particular reaction system will be apparent to the artisan.

The tetraalkylammonium compounds used, i.e., the tetraalkylammonium halides and tetraalkylammonium hydroxide, are generally found as hydrates, and the water of hydration is exceedingly difficult to remove completely. These compounds in their hydrated form can be used as starting materials for the herein-described method. However, the water present reduces the yield by reacting with the alkali metal superoxide, so that in order to obtain high yields of the desired product, sufficient alkali metal superoxide should be used to react with both the hydrated water and the tetraalkylammonium compound. For example, we have found that tetramethylammonium hydroxide pentahydrate may be used with good results if an 11 to 1 ratio of superoxide to hydroxide is used; the reaction then is believed to proceed according to the equation:

$$2(CH_3)_4NOH \cdot 5H_2O + 22MO_2 \rightarrow$$
$$2(CH_3)_4NO_2 + 22MOH + 15O_2$$

In one test in which the method and practice of this invention was illustrated, potassium superoxide and tetramethylammonium hydroxide pentahydrate in an 11 to 1 mol ratio were placed in a flask containing glass beads, and the flask was evacuated and rotated for seventy-two hours. Oxygen was evolved during the reaction, and X-ray analysis of the crude product showed the presence of tetramethylammonium superoxide. The crude solids were then extracted with liquid ammonia and the purified tetramethylammonium superoxide, which was obtained after evaporation of the liquid ammonia, was analyzed for carbon, hydrogen and nitrogen; the results are given below:

$(CH_3)_4NO_2$

|   | Theoretical, percent | Found, percent |
|---|---|---|
| C | 45.3 | 45.0 |
| H | 11.3 | 11.6 |
| N | 13.2 | 13.0 |

In another test, 42.5 millimoles of tetramethylammonium fluoride and 90.0 millimoles of potassium superoxide were reacted for four hours in refluxing ammonia, using a Dry-Ice cooled reflux condenser. The solution produced was yellow in color and upon evaporation a yellow solid was obtained. This yellow solid was shown by both chemical analysis and X-ray diffraction analysis to be tertamethylammonium superoxide, $(CH_3)_4NO_2$, along with traces of potassium superoxide and tetramethylammonium fluoride. The insoluble residue was analyzed and shown to be potassium fluoride with a trace of tetramethylammonium superoxide.

Other tetraalkylammonium halides, such as the tetraalkylammonium chloride, and other alkali metal super oxides, e.g., sodium superoxide, can also be used in the above manner.

The tetraalkylammonium superoxides are very reactive with water and should be protected against atmospheric moisture. This reactivity with moisture gives these compounds utility in self-contained breathing apparatus, such as is employed in non-respirable atmospheres and for high altitude flying, in partial or total replacement of potassium superoxide now in use for this purpose. The reactivity of these superoxides with water to produce pure oxygen also provides a very convenient means for the production of pure oxygen when quickly needed in modest amounts. When maintained in a suitable closed vessel under an oxygen atmosphere, desired amounts of oxygen can be produced and removed for immediate use by metering into the vessel appropriate amounts of water to control the speed and extent of the oxygen producing reaction. These compounds are also excellent oxidizing agents for carrying out oxidizing chemical reactions and are useful as intermediates in the synthesis of other complex compounds wherein the quaternary ammonium or superoxide ion is desired to be introduced.

This application is a continuation-in-part of our application, Serial No. 832,863, filed August 10, 1959, and now abandoned.

According to the provisions of the patent statutes, we have explained the principle and mode of practicing our invention, and have described what we now consider to be its best embodiments. However, we desire to have it understood that within the scope of the appended claims, the invention may be practiced otherwise than as specifically described.

We claim:

1. A method of producing a tetraalkylammonium superoxide of the formula $R_4NO_2$, where R is a lower alkyl group, which comprises reacting an alkali metal superoxide with a tetraalkylammonium compound of the formula $R_4NX$, where R is a lower alkyl group and X is an anion selected from the group consisting of halide ions and hydroxide ion, and recovering the tetraalkylammonium superoxide thus formed.

2. A method in accordance with claim 1 in which R is a methyl group.

3. A method in accordance with claim 1 in which the tetramethylammonium compound is in hydrated form.

4. A method in accordance with claim 1 and carried out in a solvent in which one of the products of the reaction is substantially insoluble.

5. A method in accordance with claim 4 in which the solvent is liquid ammonia.

6. A method of producing tetramethylammonium superoxide which comprises reacting tetramethylammonium fluoride with potassium superoxide in liquid ammonia and recovering the tetramethylammonium superoxide thus formed.

7. A method of producing tetramethylammonium superoxide which comprises reacting tetramethylammonium hydroxide with potassium superoxide, and recovering the tetramethylammonium superoxide thus formed.

8. A method of producing tetramethylammonium superoxide which comprises reacting tetramethylammonium hydroxide pentahydrate with an alkali metal superoxide, in a ratio of about 11 mols of superoxide for each mol of hydroxide, and recovering the tetramethylammonium superoxide thus formed.

No references cited.